United States Patent Office 3,390,086
Patented June 25, 1968

3,390,086
SULFUR CONTAINING ASHLESS DISPERSANT
Rosemary O'Halloran, Union, N.J., assignor to Esso Research and Engineering Company, a corporation of Delaware
No Drawing. Filed Dec. 29, 1964, Ser. No. 422,036
8 Claims. (Cl. 252—47.5)

This invention relates to products formed by reacting ashless dispersants containing amine groups with sulfur, uses of said products, and methods of preparing said products.

Recently, certain high molecular weight nitrogen-containing amide and imide derivatives of various carboxylic acids and carboxylic acid anhydrides have become known as ashless sludge dispersants for lubricating oils, fuel oils, gasolines, etc. While effective as sludge dispersants at moderate temperatures, many of these dispersants have poor stability at elevated temperatures and break down to form sludge and deposits. In the case of many lubricating oil compositions formulated for high temperature use, these dispersants have not been as effective as desired. It has now been found that certain of these said dispersants can be improved in their thermal stability by reaction with sulfur. By so treating these dispersants, they can be effectively used in many high temperature applications such as automatic transmission oils, high temperature diesel oils, aircraft oils, and gas engine oils. In addition, the incorporation of sulfur generally imparts load-carrying ability to the dispersant.

The dispersants which are sulfurized according to the invention are the mineral-oil-soluble carboxylic acid (or corresponding acid anhydride) amides and imides of polyalkyleneamines, wherein the amide or imide linkages are formed with primary amine groups of said polyalkyleneamines, and wherein said polyalkyleneamines have available secondary amine groups for sulfurization.

The sulfurized dispersants of the invention can be represented by the following word formula:

Acid₁—polyalkyleneamine—acid₂ or aldehyde or ketone
|
sulfur wherein the first terminal primary amine group of the polyalkyleneamine is reacted with acid₁, which can be either an acid or an acid anhydride, to convert said primary amino group into the corresponding amide or imide, wherein the second terminal primary amine group of the polyalkyleneamine is reacted with acid₂ which can be the same as acid₁, or it can be a fatty acid, or the second terminal primary amine group can be reacted with $C_1$ to $C_{10}$ aldehyde or ketone to thereby form a Schiff's base. The elemental sulfur is reacted with a secondary amine group of the polyalkyleneamine.

Acid₁ includes alkenylsuccinic anhydride which has the structure:

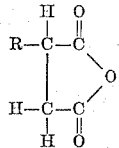

alkenylsuccinic acid, and alkenyl monocarboxylic acid having the structure: R—CH₂CH₂—COOH, wherein R in the preceding structures is the alkenyl group which contains about 40 to 250, preferably 70 to 120, carbon atoms. Because of its ready availability and low cost, the alkenyl portion of the molecule is preferably a polymer of a $C_2$ to $C_5$ monoolefin, said polymer generally having a molecular weight of about 700 to 3,000, e.g. about 700 to 1300. A particularly preferred example of such an olefin polymer is polyisobutylene.

The polyalkyleneamines include those of the general formula:

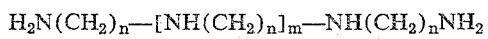

wherein $n$ is preferably 2 or 3 and $m$ is 0 to 10. Examples of such polyalkyleneamines include diethylene triamine, tetraethylene pentamine, octaethylene nonamine, tetrapropylene pentamine, etc.

Acid₂ is selected from the group consisting of acid₁, and fatty acid of 1 to 30, preferably 1 to 18, carbon atoms in an aliphatic hydrocarbon chain, which can be branched or straight chain, saturated or unsaturated, and including monocarboxylic acids and dicarboxylic acids. Examples of such acids include acetic acid, fumaric acid, capric acid, adipic acid, lauric acid, oleic acid, linoleic acid, etc.

Aldehydes and ketones mentoned above will contain from 1 to 10 carbon atoms and consist only of C, H and O. Examples of such alhehydes and ketones include formaldehyde, propionaldehyde, butyraldehyde, n-valeraldehyde, caproaldehyde, isobutyraldehyde, heptaldehyde, benzaldehyde, cinnamaldehyde, acetone, methyl ethyl ketone, and acetophenone.

The sulfurized dispersants of the invention are prepared in several ways. Since the primary amine groups are more reactive than the secondary amine groups, the polyalkyleneamine can be first reacted with acid₁, then reacted with acid₂ or aldehyde or ketone, and finally reacted with sulfur. Or, the polyalkyleneamine can be simultaneously reacted with a mixture of acid₁ and acid₂, or a mixture of acid₁ and aldehyde, or a mixture of acid₁ and ketone, to react the primary amine groups, after which the polyalkyleneamine is reacted with sulfur. Or, acid₂ or aldehyde or ketone can be first reacted with the polyalkyleneamine, then acid₁ is reacted with the polyalkyleneamine, followed by reaction with sulfur.

The preceding reactions of the polyalkyleneamine with acid₁ and acid₂ are condensation reactions and are carried out by simply heating (e.g. to about 200–350° F.) the reactants and removing the water of condensation. This water can be readily removed by blowing nitrogen through the reaction mixture during the course of the reaction which will usually be complete in about 1 to 30 hours.

The reaction of the aldehyde or ketone with polyalkyleneamine, or with acid₁—polyalkyleneamine material, is also carried out by heating the reactants to about 200° to 500° F. for about 1 to 10 hours in order to remove water of condensation and form a Schiff's base.

During the reaction of the primary amine groups, an inert diluent such as mineral lubricating oil can be mixed with the reactants in order to reduce the viscosity of the reaction mixture and promote better contacting of the reactants with each other.

Once the primary amine groups of the polyalkyleneamine have been converted to amide, imide, or Schiff's base groups, then the secondary amine groups are sulfurized. The sulfurization reaction is carried out by simply heating the dispersant, usually dissolved in mineral oil, and sulfur at a temperature of about 200° to 400° F. for about 0.25 to 10 hours. Usually, the amount of sulfur incorporated in the final product will be about 0.1 to 5 wt. percent, preferably 0.5 to 4 wt. percent, based on the weight of sulfurized dispersant per se. Incorporating more than about 1.5 wt. percent sulfur is best carried out using a catalyst, e.g. rubber vulcanization catalysts such as zinc stearate and zinc oxide. Incorporating 1.5 wt. percent or less of sulfur generally proceeds easily without a catalyst.

In carrying out the working examples of the invention, the following dispersants were used.

Dispersant A.—This dispersant was of the type: Polyisobutenylsuccinic anhydride—tetraethylenepentamine—polyisobutenylsuccinic anhydride, wherein the alkenyl group is from polyisobutylene of about 1200 molecular weight and the compound is prepared by heating two molar proportions of said polyisobutylene with about one molar proportion of tetraethylenepentamine to give a dispersant believed to have the structure:

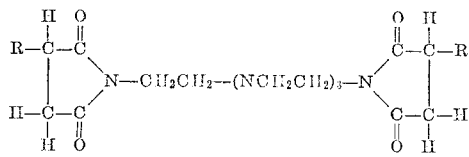

wherein R is the polyisobutenyl group.

As seen by the above structure, the two terminal primary groups of the tetraethylenepentamine (the polyalkyleneamine) have been converted into imide structures by reaction with polyisobutenylsuccinic anhydride (acid₁). Remaining are secondary amine groups, and it is these groups which it is believed are acted upon by the sulfurizing agent.

Dispersant B.—This dispersant is of the type: Acid₁—polyalkyleneamine and has the structure:

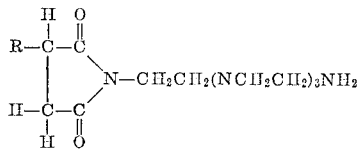

wherein R is a polyisobutenyl group of about 800 molecular weight.

Dispersant C.—This dispersant is of the type: Acid₁—polyalkyleneamine—aldehyde and is believed to have the structure:

wherein R is the polyisobutenyl group of about 760 molecular weight polyisobutylene. Dispersant C was prepared as follows: Into a flask equipped with stirrer, thermometer and water separator, were placed equal molar proportions of polyisobutenylsuccinic anhydride (derived from 760 molecular weight polyisobutylene) and diethylenetriamine. 25 wt. percent of mineral lubricating oil was added as a diluent and 20 wt. percent xylene was added as a water-entraining agent, said weight percents being based on the weight of the reactants. When solution was completed, the mixture was refluxed for about 8 hours at 165° C. and a molar amount of water was removed. After this, a molar amount of benzaldehyde was added and the mix was refluxed at 160° C. for about 8 hours. Another molar amount of water was collected in this operation. The xylene was then removed under high vacuum. The resulting product was a mineral lubricating oil concentrate consisting of about 70 wt. percent of Dispersant C dissolved in about 30 wt. percent of said mineral lubricating oil.

Dispersant D.—A dispersant of the type:

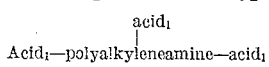

was prepared using 3 molar proportions of acid₁, per molar proportion of polyalkyleneamine.

Acid₁ was polyisobutenyl propionic acid, a typical preparation of which follows: A solution was first prepared consisting of 2000 grams of polyisobutylene of about 950 molecular weight dissolved in 100 grams of carbon tetrachloride. Chlorine gas was bubbled through the stirred solution at ambient temperatures (77° F.) for a period of four hours in order to chlorinate the polyisobutylene.

Following the chlorination step, the carbon tetrachloride solvent was removed from the mixture by purging with nitrogen at 285° F. The chlorinated polyisobutylene had a chlorine content of 4.33%.

A mixture of 600 grams of the chlorinated polyisobutylene thus prepared and 55 grams of acrylic acid was heated to 450° F. over a period of 18 hours. Hydrogen chloride was evolved from the mixture during this heating. The mixture was then purged with nitrogen for one-half hour at 450° F., after which the mixture was cooled to 250° F. and filtered through Dicalite (diatomaceous earth) filter aid. The product, identified as polyisobutenyl propionic acid, contained 0.3 weight percent of chlorine and had a saponification number of 52.1 mg. KOH/gm.

A mixture of 355 grams of the polyisobutenyl propionic acid, 132 grams of a mineral lubricating oil (150 SUS viscosity at 100° F.) and 44 grams of tetraethylenepentamine was heated with stirring to 300° F. for 5 hours, during which time the mixture was continuously purged with nitrogen to remove water formed during the condensation of the acid and the polyamine. The product of the reaction was filtered through Dicalite and was found to contain 2.63% nitrogen and consisted of a mineral lubricating oil solution of Dispersant D.

Dispersant E.—A dispersant of the type: Acid₁—polyalkyleneamine dissolved in about 30 wt. percent mineral lubricating oil was prepared in the same manner as Dispersant D except that equal molar proportions of the polyisobutenyl propionic acid and tetraethylenepentamine were reacted together.

EXAMPLE I 487.5 g. of a lubricating oil solution consisting of about 30 wt. percent mineral lubricating oil and about 70 wt. percent of Dispensant A, was charged to a beaker and heated to 290° F. over a period of 40 minutes. Elemental sulfur was added as a yellow powder over a period of 3 minutes. The temperature was held at 300-305° F. while the sulfur was stirred into said solution. After five minutes, the reaction appeared complete and the product was allowed to cool to room temperature. No filtration of the product was necessary since the sulfur content was relatively low and there was no unreacted sulfur present.

EXAMPLES II TO IV

Example I was repeated using varying amounts of sulfur to incorporate different amounts of sulfur into said oil solution of Dispersant A.

EXAMPLE V

Example I was repeated except that the sulfurization was carried out using 0.5 wt. percent of zinc of stearate and 0.5 wt. percent of zinc oxide as catalysts for the sulfurization, said weight precents being based upon the total charge to the beaker. Upon completion of the sulfurization the product was filtered to remove excess stearate, oxide, and sulfur.

EXAMPLE VI

Example I was repeated except that 0.5 wt. percent zinc oxide and 0.5 wt. percent diethylenetriamine were used to help promote the reaction.

The products of Examples I to VI above were then tested for oxidation in a Laboratory Multiple Oxidation Test (LMOT). In this test, a 40 gm. sample of an auto crankcase oil containing 2.5 wt. percent of the sulfurized product was prepared. Then, 2.5 gms. of iron filings, a 19" piece of No. 14 gauge copper wire and a sanded aluminum strip (12" x ¼" x ¹⁄₁₆") were added as catalysts while 10 liters per hour of air was bubbled through the sample which is maintained at 300° F. At the end of 120 hours, the oil is evaluated for sludge by placing a drop on a blotter and visually examining the paper for sludge. Also, the aluminum strip is examined for varnish deposits, and the neutralization number (ASTM–D–974) of the used, i.e. oxidized, oil is determined.

In addition to the LMOT test, the samples were also tested for: milligrams of wear of the steel pin in a Falex machine operating 30 minutes under a 350 pound load, and copper strip corrosion (ASTM D-130) by color rating a copper strip after 3 hours immersion of said copper strip in the oil sample at 210° F. For comparison, a sample of 2.5 wt. percent (based on the total weight of the sample being tested), of the aforesaid oil solution of Dispersant A, which had not been sulfurized, was similarly tested in said crankcase oil.

The auto crankcase oil used to prepare the above samples was a 10W–30 grade crankcase motor oil consisting of neutral distillate mineral lubricating oil, containing a pour depressant additive, a 100,000 mol. wt. polyisobutylene V.I. improving additive and a $P_2S_5$ treated α-pinene as an antioxidant additive.

The test results obtained on the preceding samples are summarized in Table I which follows.

EXAMPLE VII 1 part of sulfur was heated with 99 parts of the aforesaid oil solution of Dispersant C (70% Dispersant C and 30% oil) for 15 minutes at 300° F. The resulting product analyzed 0.96 wt. percent sulfur.

2.5 wt. percent of the product of Example VII was added to 97.5 wt. percent of the crankcase motor oil previously described and subjected to the aforesaid tests. The products tested and the results obtained are summarized in the following Table II.

TABLE II

| Crankcase Oil+2.5 wt. percent Product of Example | LMOT Used Oil | | | ASTM D-130 Cu. Strip, 3 hr./210° F. | Steel Corrosion | Falex Pin Wear, mg. 30 min. at 350 lb. |
|---|---|---|---|---|---|---|
| | Neut. No. | Sludge | Varnish | | | |
| VII | 4.2 | Trace | 0 | | | 1.6 |

The steel corrosion test of Table II was carried out by immersing a quarter section of a copper-lead bearing with a steel backing into a 200 gm. oil sample containing 0.625 wt. percent PbO, which sample was maintained at 300° F. for five days. The test piece was washed off and placed in a wet atmosphere for seven days, then visually rated for rust.

As seen by Table II, the sulfurized additive gave no sludge in the LMOT test. In comparison, as noted in Table I, the unsulfurized Dispersant A gave very heavy sludge deposits in the same test. The Falex pin wear was 1.6 mg. with the additive of the example. The crankcase oil per se without any dispersant gave a Falex pin wear of 5.8, illustrating sulfurization improved the wear inhibiting properties of the dispersant.

Each of the aforesaid oil solutions of Dispersants A to E were sulfurized according to the method of Example I to form products ranging from 1.0 to 1.32 wt. percent sulfur. These products were then tested at a concentration of 2.5 wt. percent in the aforesaid crankcase oil in the LMOT test (300° F.). For comparison, samples of said crankcase oil containing 2.5 wt. percent of the oil solution of the unsulfurized dispersants were similarly tested.

The compositions tested, the sulfur content of the sulfurized dispersant product, and the results obtained are summarized in Table III which follows:

TABLE I

| Crankcase Oil+2.5 wt. percent Product of Example | Wt. percent S in Product | LMOT Used Oil | | | ASTM D-130 Cu. Strip, 3 hr./210° F. | Falex Pin Wear, mg. 30 min. at 350 lb. |
|---|---|---|---|---|---|---|
| | | Neut. No. | Sludge | Varnish | | |
| Unsulfurized Dispersant A | 0 | 11.4 | V. Heavy | None | Slight tarnish | 3.9 |
| Example I | 2.46 | 4.6 | None | do | Black | |
| Example II | 1.70 | 3.4 | do | do | Moderate tarnish | |
| Example III | 1.32 | 4.6 | do | do | do | |
| Example IV | 1.30 | 3.4 | Trace | do | do | |
| Example V | 4.58 | 3.6 | None | do | Dark tarnish | 2.1 |
| Example VI | 3.87 | 3.9 | do | do | do | 3.3 |

As seen by Table I, the crankcase oil containing unsulfurized Dispersant A, formed very heavy sludge deposits, and exhibited the relatively high neutralization number of 11.4 mg. KOH/gm. after subjection to air blowing while at 300° F. for 120 hours. On the other hand, the sulfurized ashless dispersants of Examples I to VI, each inhibited both sludging and increase in acidity, and gave lower wear as measured by the Falex machine.

TABLE III

| Crankcase Oil+ 2.5 wt. percent of | Type Dispersant | Wt. Percent S | LMOT at 300° F. | | |
|---|---|---|---|---|---|
| | | | Neut. No. | Sludge | Varnish |
| Sulfurized A | Acid₁—Polyalkyleneamine—Acid₂ | 1.32 | 4.6 | 0 | 0 |
| Unsulfurized A | | 0 | 11.4 | (¹) | 0 |
| Sulfurized C | Acid₁—Polyalkyleneamine—Aldehyde | 1.0 | 2.4 | 0 | 0 |
| Unsulfurized C | | 0 | 11.4 | (¹) | 0 |
| | Acid₁ | | | | |
| | \| | | | | |
| Sulfurized D | Acid₁—Polyalkyleneamine—Acid₁ | 1.0 | 5.3 | 0 | 0 |
| Unsulfurized D | | 0 | 9.6 | (²) | 0 |
| Sulfurized | Acid₁(Polyisobutenylsuccinicanhydride) | 1.0 | 9.4 | (¹) | (³) |
| Unsulfurized | | 0 | 7.8 | (²) | (⁴) |
| Sulfurized B | Acid₁—Polyalkyleneamine | 1.0 | 8.0 | (²) | 0 |
| Unsulfurized B | | 0 | 9.3 | (²) | 0 |
| Sulfurized E | Acid₁—Polyalkyleneamine | 1.0 | 7.1 | (⁵) | 0 |
| Unsulfurized E | | 0 | 7.1 | 0 | 0 |

¹ Very heavy.  ² Heavy.  ³ Moderate.  ⁴ Trace.  ⁵ Very light.

As seen by Table III, when both primary amine groups of the polyalkyleneamine are already reacted so that the remaining amine groups available for sulfurization are secondary amine groups, then a considerable improvement in oxidation stability is obtained, as demonstrated by the sulfurization of Dispersants A, C and D. On the the other hand, while B and E are excellent dispersants, when sulfurized, very little improvement in oxidation stability results. Sulfurizing the polyisobutenyl-succinic anhydride per se, i.e. an acid$_1$, also had little effect.

EXAMPLE VIII 4 wt. percent of the sulfurized oil solution of Dispersant A of Example IV was added to 96 wt. percent of mineral lubricating oil. Similar blends were made up using 4 wt. percent and 2 wt. percent respectively of sulfurized oil solution of Dispersant B (containing 1 wt. percent sulfur and sulfurized according to the method of Example I) in mineral lubricating oil. These blends were tested for Oxidation Stability and in the Panel Coker test.

The Oxidation Stability test was carried out by blowing two cubic feet per hour of air through a stirred 500 ml. sample of the oil composition at 340° F. having immersed therein a copper-lead bearing section. The viscosity after 19 and 23 hours on test is determined, and also the loss in milligrams of said bearing section.

The Panel Coker test is described in Military Specification MIL–L–7808–C and measures the deposit forming characteristics of the oil. Briefly described, in the Panel Coker test, the oil sample is heated to 340° F. and sprayed onto a stainless steel panel held at 700° F. and then recirculated. Test duration is 8 hours.

The results of the above tests, as well as similar tests on the same mineral lubricating oil containing unsulfurized oil solutions of Dispersants A and B, are summarized in Table IV which follows:

TABLE IV

|  | Dispersant A | | Dispersant B | | |
|---|---|---|---|---|---|
|  | Not Sulfurized | Sulfurized | Not Sulfurized | | Sulfurized |
| Oxidation Stability, percent.. | 4 | 4 | 4 | 2 | 2 |
| Visc./100 °F.: | | | | | |
| 19 hrs | 997 | 102 | 559 | 419 | 405 |
| 23 hrs | 1,286 | 149 | 667 | 576 | 505 |
| CuPb BWL, mg | −340 | −36 | −19 | −98 | −43 |
| Panel Coker: Deposit, gms | 1,074 | 180 | | | |

As seen by Table IV, sulfurizing Dispersant A drastically reduced its viscosity increase, the copper-lead bearing weight loss and the deposit forming tendency of the oil composition. Sulfurizing Dispersant B resulted in little improvement.

Another characteristic of sulfurization according to the invention is that it reduces the tendency of the ashless dispersant to unduly thicken oils containing certain types of polymeric additives. For example, one multi-functional polymeric additive widely used in lubricating oil has the multi-functions of V.I. improving, pour depressing and sludge dispersing and is a tripolymer of vinyl acetate, alkyl fumarate and maleic anhydride. This tripolymer when used together with ashless dispersants, increases the viscosity of the oil. However, this viscosity increase is lessened by sulfurizing the ashless dispersant. This is illustrated in the following example:

EXAMPLE IX

A base oil composition was made up consisting of 6 wt. percent of said tripolymer of vinyl acetate, alkyl fumarate and maleic anhydride, in 94 wt. percent of a light mineral oil having a viscosity of 170 SUS at 100° F. To samples of this base oil was added 3 wt. percent of the aforesaid oil concentrate of unsulfurized Dispersant A (i.e. 70 wt. percent Dispersant A in 30 wt. percent mineral lubricating oil), and 3 wt. percent of said oil concentrate of Dispersant A sulfurized to a sulfur content of 1.5% and 4.0% sulfur, respectively. The viscosity data of the resulting blends and their compositions are shown in the following Table V:

TABLE V

| | Visc./100° F. SUS |
|---|---|
| Base oil | 252.4 |
| Base oil + 3.0% unsulfurized Disp. A | 357.9 |
| Base oil + 3.0% sulfurized Disp. A (1.5% S) | 347.6 |
| Base oil + 3.0% sulfurized Disp. A (4.0% S) | 340.9 |

As seen by preceding Table V, the base oil with tripolymer had a viscosity at 252.4 SUS at 100° F. The addition of 3% unsulfurized Dispersant A concentrate increased this viscosity to 357.9 SUS. However, when the Dispersant A concentrate sulfurized to 1.5 wt. percent S was used, the viscosity increased to 374.6 SUS. Using a more highly sulfurized Dispersant A concentrate (4.0 wt. percent S), resulted in a viscosity of 340.9 SUS. In each case, the sulfurized material reduced the thickening effect brought about by the tripolymer.

EXAMPLE X

A lubricating oil composition was prepared consisting of 4 wt. percent of the oil concentrate of Dispersant A (70% Dispersant A) which has been sulfurized to 4 wt. percent sulfur by the method of Example V, and 96 wt. percent of a mineral lubricating oil. A second composition, which is a premium commercial gas engine lubricant, consisting of the same mineral lubricating oil but containing a mixture of high alkalinity barium sulfonate and calcium-barium nonyl phenol sulfide as detergent additives, was used as a comparison.

The above two compositions were then tested in a Chevrolet gas engine which was a 6-cylinder test engine of 216.5 cu. in. displacement, operating on natural gas, and having a horsepower rating of 34 horsepower at 1500 r.p.m. test conditions. The engine operated at 2.5% excess oxygen in the exhaust to maximize nitrogen fixation and oil degradation. This test was carried out for a period of 96 hours after which the pistons and cylinders of the engine were checked for varnish and sludge, and were also checked for the bearing weight loss of the copper/lead bearings in the engine. The results obtained are summarized in the following Table VI:

TABLE VI

| Demerits (0 to 10) | Premium Commercial Gas Engine Lubricant | 4 wt. Percent Sulfurized Concentrate of Detergent A containing 4 wt. Percent S |
|---|---|---|
| Overall | 0.24 | 0.15 |
| Piston Skirt Varnish | 0.1 | 0.1 |
| Combustion Chamber | 0.28 | 0.20 |
| Valves | 0.34 | 0.28 |
| Ring Zone | 0.51 | 0.30 |
| Compression Grooves #1 & 2 | 0.80 | 0.58 |
| Sludge | 0.11 | 0.03 |
| Ring Sticking | Nil | Nil |
| Piston Undersides | 0.7 | 0.2 |
| Copper-Lead Brg. Wt. Loss, Avg. mgs | 2,521 | 1,829 |

As seen by the Table VI, the sulfurized additive of the invention gave a consistently lower demerit rating on a scale where 0 is perfect and 10 is the worst possible. Specifically, the amount of sludge was less, and the varnish and deposits were consistently less when using the sulfurized additive. In addition, the corrosion of the copper/lead bearings were also significantly less when using the sulfurized additive of the invention.

EXAMPLE XI

.01 wt. percent of the product of Example I is dispersed in gasoline.

EXAMPLE XII

Example I is repeated except that no mineral lubricating oil is used as solvent. Rather, Dispersant A per se is reacted directly with elemental sulfur to sulfurize said dispersant to a sulfur content of about 3.0 wt. percent, based on the weight of sulfurized Dispersant A.

In brief summary, the present invention is directed towards ashless dispersants comprising a polyalkyleneamine, e.g. polyethyleneamine, containing 3 to 12 nitrogen atoms, having one terminal primary amine group reacted with alkenylsuccinic acid or anhydride, or alkenyl monocarboxylic acid and the other primary terminal group reacted with said anhydride or acids, or with a fatty acid, or a ketone or aldehyde. Substantially, all of the terminal primary amine groups present should be substantially reacted before the sulfurizing occurs, since it is desired to place the sulfur groups onto secondary amine groups. The resulting additive product of the invention can be used in fluid petroleum hydrocarbons, e.g. mineral oils, gasoline, etc. in amounts of .001 to 10 wt. percent based on the total weight of the fluid hydrocarbon composition. Concentrates, usually in lubricating oil, of 10 to 80% of the sulfurized dispersant can be formed as a convenient manner of handling the additive of the invention. Gasolines and fuels will usually contain .001 to 1.0 wt. percent of the additive, while lubricating oils will usually contain 1 to 10 wt. percent of said additive.

What is claimed is:

1. An ashless dispersant comprising a polyalkyleneamine having one of its terminal primary amine groups condensed with a first acid selected from the group consisting of alkenylsuccinic anhydride, alkenylsuccinic acid, and alkenyl monocarboxylic acid, wherein said alkenyl groups contain about 40 to 250 carbon atoms; said polyalkyleneamine having its second terminal primary amine group condensed with a material selected from the group consisting of said first acid, $C_1$ to $C_{30}$ fatty acid, $C_1$ to $C_{10}$ aldehydes and ketones consisting only of carbon, hydrogen and oxygen; said polyalkyleneamine containing a total of 3 to 12 amine groups and said alkylene groups thereof each containing 2 to 3 carbon atoms; said ashless dispersant being sulfurized with elemental sulfur to a sulfur content of 0.1 to 5.0 wt. percent based on the weight of sulfurized dispersant.

2. An ashless dispersant of the formula:

$$Acid_1\text{—polyalkyleneamine—}R_1$$

sulfurized with elemental sulfur to a sulfur content of 0.1 to 5.0 wt. percent based on the weight of sulfurized dispersant, wherein said $acid_1$ is selected from the group consisting of alkenylsuccinic anhydride, alkenylsuccinic acid and alkenyl monocarboxylic acid, said alkenyl groups containing about 40 to 250 carbon atoms; wherein said polyalkyleneamine is of the general formula:

$$H_2N(CH_2)_n\text{—}[NH(CH_2)_n]_m\text{—}NH(CH_2)_nNH_2$$

wherein $n$ is 2 to 3 and $m$ is 0 to 10; wherein said $R_1$ is selected from the group consisting of $acid_1$, $C_1$ to $C_{30}$ fatty acid, and aldehydes and ketones consisting only of carbon, hydrogen and oxygen and containing 1 to 10 carbon atoms.

3. A dispersant according to claim 2, wherein said alkenyl group is polyisobutenyl and said polyalkyleneamine is polyethyleneamine.

4. An ashless dispersant of the formula:

Polyisobutenylsuccinic anhydride—polyethyleneamine—polyisobutenylsuccinic anhydride sulfurized with elemental sulfur to a sulfur content of 0.5 to 4.0 wt. percent sulfur, wherein said polyisobutenyl groups have a molecular weight in the range of about 700 to 3,000 and wherein said polyethylene amine contains 3 to 12 nitrogen atoms.

5. A fluid petroleum hydrocarbon composition comprising a major amount of fluid petroleum hydrocarbon and .001 to 10.0 wt. percent of the sulfurized dispersant of claim 1.

6. A lubricating oil composition comprising a major amount of mineral lubricating oil and about .1 to 10 wt. percent of the sulfurized dispersant of claim 1.

7. A gasoline containing about .001 to 1.0 wt. percent of the sulfurized dispersant of claim 1.

8. A mineral oil concentrate consisting essentially of mineral lubricating oil and about 10 to 80 wt. percent of the sulfurized dispersant of claim 1.

References Cited

UNITED STATES PATENTS

| | | | |
|---|---|---|---|
| 3,309,316 | 3/1967 | McNinch et al. | 252—47.5 |
| 2,264,319 | 12/1941 | Lincoln et al. | 260—139 X |
| 2,278,719 | 4/1942 | Davis et al. | 260—139 |
| 3,280,034 | 10/1966 | Anzenberger et al. | 252—51.5 |
| 3,184,411 | 5/1965 | Lowe | 252—46.7 |
| 3,185,646 | 5/1965 | Anderson et al. | 252—46.7 |
| 3,185,647 | 5/1965 | Anderson et al. | 252—46.7 |
| 3,200,107 | 5/1965 | LeSuer | 252—47.5 X |
| 3,216,936 | 11/1965 | LeSuer | 252—51.5 X |
| 3,219,666 | 11/1965 | Norman et al. | 252—51.5 X |

DANIEL E. WYMAN, *Primary Examiner.*

PATRICK P. GARVIN, *Examiner.*